(No Model.) 2 Sheets—Sheet 1.

E. RUHLAND.
PHOSPHATE SOWING DEVICE.

No. 314,265. Patented Mar. 24, 1885.

Witnesses:
C. G. Trevitt
Warren C. Stone

Inventor:
Ernest Ruhland
by Alex Mahon
Attorney (No Model.) 2 Sheets—Sheet 2.

E. RUHLAND.
PHOSPHATE SOWING DEVICE.

No. 314,265. Patented Mar. 24, 1885.

Witnesses:
C. G. Trevitt
Warren C. Stone

Inventor:
Ernest Ruhland
by Alex Mahon
Attorney

UNITED STATES PATENT OFFICE.

ERNEST RUHLAND, OF AUBURN, NEW YORK.

PHOSPHATE-SOWING DEVICE.

SPECIFICATION forming part of Letters Patent No. 314,265, dated March 24, 1885.

Application filed June 3, 1884. (No model.)

*To all whom it may concern:*

Be it known that I, ERNEST RUHLAND, of Auburn, county of Cayuga, State of New York, have invented certain new and useful Improvements in Phosphate-Sowing Devices, of which the following is a full and exact description, reference being had to the accompanying drawings, making part of this specification, in which—

Figure 1:
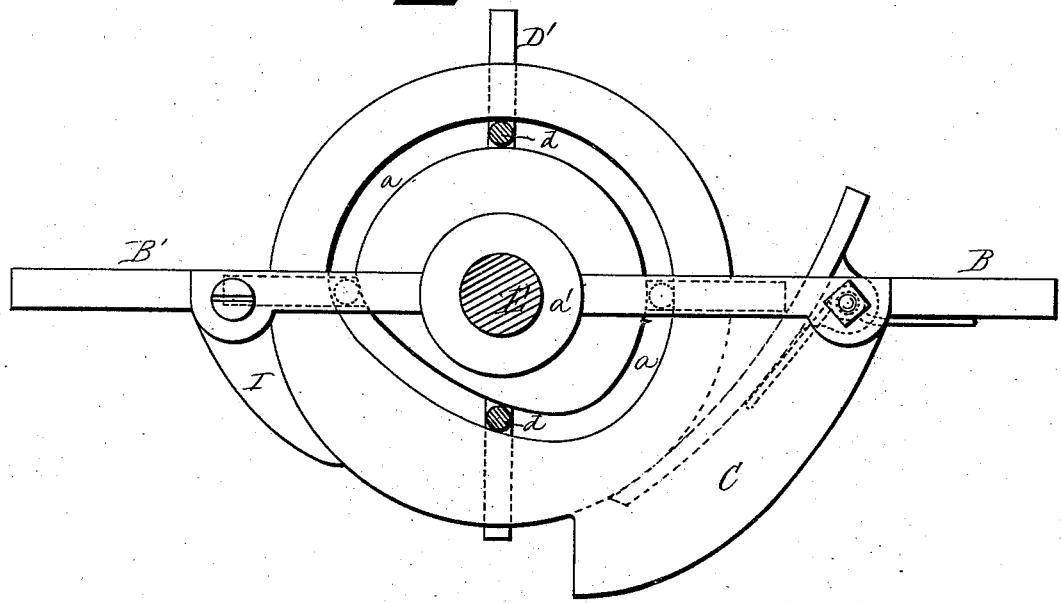
Figure 2:
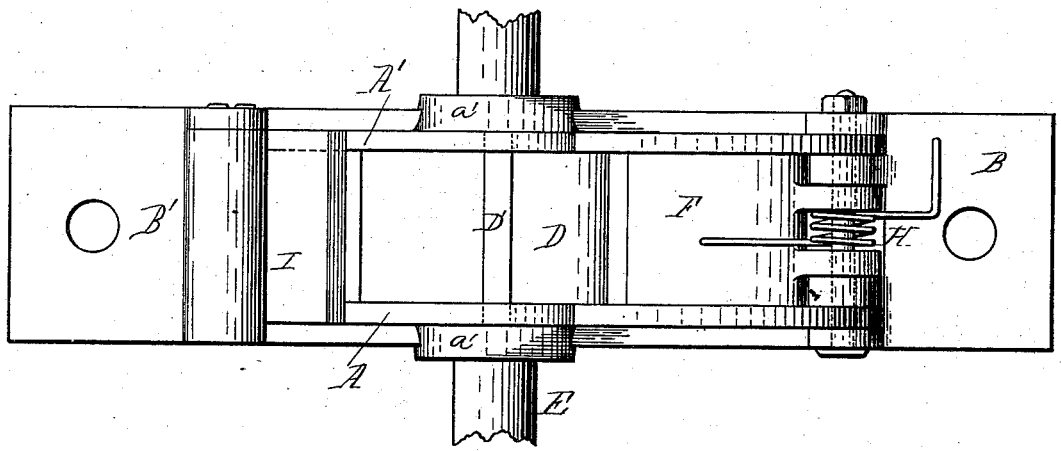
Figure 3:
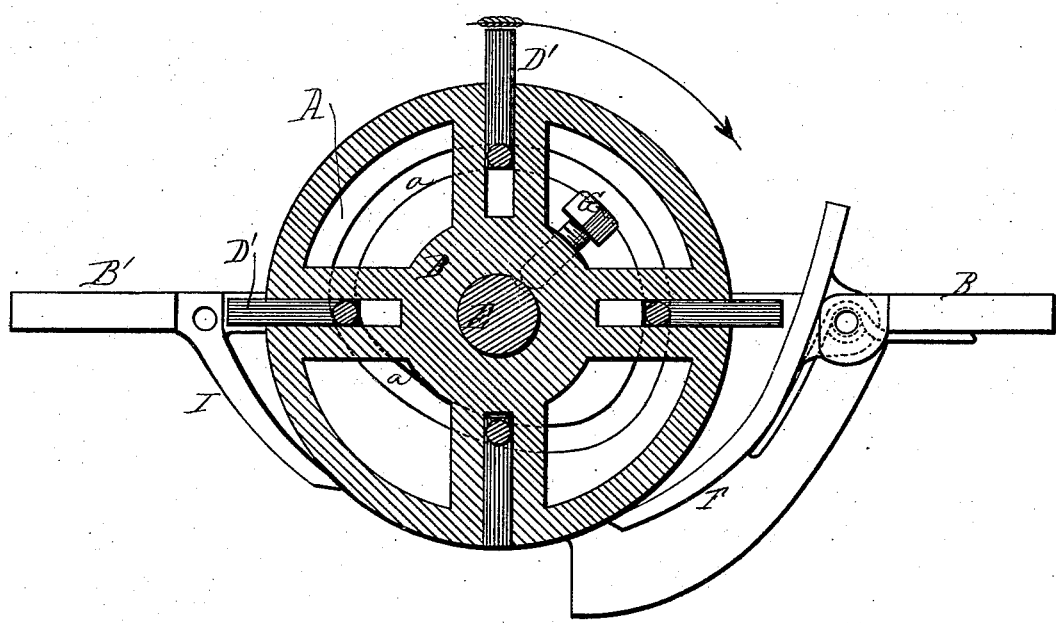
Figure 4:
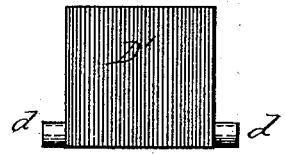

Figure 1 is a side view of the device, showing in dotted lines the regulator and cleaner. Fig. 2 is a bottom view. Fig. 3 is a longitudinal section, and Fig. 4 is a face view, of one of the blades or wings.

My invention relates to that class of fertilizer-distributers employing a rotary disk arranged within a case secured to the bottom of the hopper, and in which disk reciprocating blades or wings are mounted, and which are adapted to move out from the disk and into the hopper for carrying the fertilizer therefrom to the discharge-outlet of the case and be retracted into the disk after the discharge thereof.

My invention consists in the combination, with the disk provided with a series of slots in which the blades or wings are mounted and adapted to slide, and to the means for controlling the reciprocation of said blades in the revolving movement of the disk.

It further consists in the combination, with the disk provided with the reciprocating blades or wings and mounted within the casing, of a yielding bottom or regulator adapted to be moved or swung out by the action of the blades thereon to permit the discharge of the fertilizer and to be retracted into engagement with the periphery of the disk directly behind the blade or wing, whereby the face of the disk is kept clean and the discharge of any fertilizer, except as brought by the blades from the hopper, is prevented.

It further consists, in combination with the revolving disk provided with the reciprocating blades or wings, of a cleaner connected to the rear portion of the casing and engaging the periphery of the disk for removing any fertilizing material which may adhere to the disk after the blades or wings have been retracted into the disk at the discharge-point.

It further consists in certain details in the construction and arrangement of parts, all as hereinafter explained.

In the accompanying drawings a casing is shown, in which the disk is mounted. This case is composed of the two vertical side portions, A A', made to correspond to the shape of the disk. These portions are made alike, except that one of them, A, is provided with horizontal flanges B B' projecting from its periphery at its front and rear and at right angles to the vertical face thereof, and through which the case is secured to the hopper-bottom. The portion A' is secured to the inner side walls of the flanges B B' by means of bolts passing through the two, the flanges being of such width that the disk shall fit snugly between the inner faces of the side portions. The forward portions of the parts A A' are expanded, as shown at C, projecting downward and forward from the main portion and in connection with a pivoted bottom or regulator, hereinafter described, serving to form a channel for the passage of the fertilizer from the hopper to the tube or conveyer.

The disk or distributing-wheel D is provided with a series of radial slots opening outward, as shown, and extending from side to side of the wheel for receiving the blades or wings D', hereinafter referred to. These slots are of such depth as to correspond to the length of the blades or wings, so that when the blade or wing is drawn inward at the point of discharge the forward edge of the blade or wing will be flush with the periphery of the disk or wheel. The portion of the disk or wheel between the walls of the slots is cut away, as shown, to provide for lightness.

The blades or wings D' are composed of a flat plate in quadrangular form, and provided at the inner end upon both sides with projecting studs or pins $d$, which, when the blades or wings are in place, project out beyond the side face of the disk or wheel.

The side plates or casing, A A', have irregular grooves or slots formed therein, as shown at $a$, that portion of the slot which is formed in the casing above the center being in semicircular form, while the portion below the center is made in semi-oval form, and with which groove or slot the projecting studs or pins $d$ formed on the blades or wings engage when the parts are in position.

The disk or wheel is mounted on a shaft, E, which is passed through it and has its bearing in hubs $a'$, formed in the casing or portion A A', the disk or wheel being secured thereto by means of a set-screw, G, as shown.

In the forward portion of the casing between the expanded portions C of the side plates, A A', is mounted a tongue or regulator, F, having a pivotal bearing upon the pin or bolt, which holds the side plates together at this point and being secured in position thereby. This tongue extends down in curved form, as shown, and has its forward end held engaged with the periphery of the disk or wheel by means of a spiral spring, H, wrapped upon the bolt, and having one end engage the lower face of flange B and the other end the lower face of the tongue, and which tongue, in connection with the portion C of the casing, forming a channel from the hopper to the tube for the passage of the fertilizer.

A scraper, I, is formed with or otherwise rigidly attached to the flange B', and has its downwardly-projecting edge engage with the periphery of the disk or wheel, and which scraper serves to remove any fertilizing material which may adhere or stick to the periphery of the wheel.

The distributers thus constructed are connected to the bottom of the hopper, being arranged in line so as to be driven by the same shaft in any known or preferred way.

The disk or wheel is revolved in the direction of the arrow, Fig. 3, and as the same is revolved the pins or studs formed upon the blades or wings will cause those which are passing into the hopper to be thrown out sufficiently beyond the periphery of the wheel to force or carry the fertilizing material from the hopper down to and against the tongue or regulator. The blade or wing coming in contact with said tongue or regulator will force the same outward, overcoming the tension of the spring, and by the continued movement of the wheel, will carry said material downward to the point of discharge. Immediately after the blade or wing passes the point of the tongue the same will be forced backward behind it and prevent the escape of any fertilizing material which may have followed down behind the blade, and by its contact with the periphery of the wheel scrape or remove any fertilizing material which may stick thereto. The slot or groove in the side plates opposite the point of discharge curves abruptly upward, which causes the blade to be drawn inward into the slot as soon as the fertilizing material has been discharged, and as the blades fit closely within the slots any fertilizing material which may adhere to the sides of the blades will be scraped off therefrom as they are drawn inward into the slots, the scraper I serving to remove any which may adhere to the periphery of the wheel.

The slot or groove may be formed in only one of the side plates, if found desirable.

Having now described my invention, I claim—

1. The combination, with the disk or wheel provided with a series of radial slots and with the blades or wings mounted therein provided with projecting spurs, of the side plate or casing provided with the irregular groove or slot for reciprocating said blades in the revolving movement of the wheel, substantially as and for the purpose described.

2. The combination, with the disk or wheel provided with the radial slots having the reciprocating blades or wings mounted therein, of the yielding tongue or regulator engaging the periphery of the disk or wheel, and operating substantially in the manner and for the purpose set forth.

3. The combination, with the revolving disk or wheel having the reciprocating blades mounted therein, of the fixed cleaner connected to the rear portion of the casing and engaging the periphery of the wheel, substantially as and for the purpose set forth.

4. The combination, with the casing-plates A A', provided with the portions C at their forward ends, of the yielding tongue or regulator secured between said portions and engaging the periphery of the wheel, substantially as and for the purpose set forth.

ERNEST RUHLAND.

Witnesses:
JOHANN JOHANUS,
JAMES BARRY.